(12) United States Patent
Manus et al.

(10) Patent No.: US 7,610,445 B1
(45) Date of Patent: Oct. 27, 2009

(54) SYSTEM AND METHOD FOR IMPROVING DATA INTEGRITY AND MEMORY PERFORMANCE USING NON-VOLATILE MEDIA

(75) Inventors: Justin Evan Manus, San Francisco, CA (US); Douglas Anderson, Mountain View, CA (US); Yoon Kean Wong, Redwood City, CA (US); Rajan Ranga, Palo Alto, CA (US)

(73) Assignee: Palm, Inc., Sunnyvale, CA (US)

( * ) Notice: Subject to any disclaimer, the term of this patent is extended or adjusted under 35 U.S.C. 154(b) by 238 days.

(21) Appl. No.: 11/184,131

(22) Filed: Jul. 18, 2005

(51) Int. Cl.
*G06F 12/00* (2006.01)
(52) U.S. Cl. .................. 711/113; 711/104; 711/135
(58) Field of Classification Search ............... 711/113, 711/135, 103, 104, 143, 154
See application file for complete search history.

(56) References Cited

U.S. PATENT DOCUMENTS

| | | | | | |
|---|---|---|---|---|---|
| 3,478,325 | A | * | 11/1969 | Maholick et al. | 711/109 |
| 5,542,066 | A | * | 7/1996 | Mattson et al. | 711/136 |
| 5,586,291 | A | * | 12/1996 | Lasker et al. | 711/113 |
| 5,636,355 | A | * | 6/1997 | Ramakrishnan et al. | 711/113 |
| 5,754,888 | A | * | 5/1998 | Yang et al. | 710/52 |
| 5,761,705 | A | * | 6/1998 | DeKoning et al. | 711/113 |
| 5,778,418 | A | * | 7/1998 | Auclair et al. | 711/101 |
| 6,295,577 | B1 | * | 9/2001 | Anderson et al. | 711/113 |
| 6,798,599 | B2 | * | 9/2004 | Dykes et al. | 360/69 |
| 6,968,450 | B1 | * | 11/2005 | Rothberg et al. | 713/1 |
| 7,003,623 | B2 | * | 2/2006 | Teng | 711/104 |
| 7,099,993 | B2 | * | 8/2006 | Keeler | 711/113 |
| 7,136,973 | B2 | * | 11/2006 | Sinclair | 711/156 |
| 7,177,983 | B2 | * | 2/2007 | Royer | 711/133 |

OTHER PUBLICATIONS

Varma et al., "Destage Algorithms for Disk Arrays with Nonvolatile Caches," IEEE Tr. Computers, Feb. 1998, pp. 228-235.*

IEEE 100 The Authoritative Dictionary of IEEE Standards Terms $7^{th}$ edition, 2000, IEEE Press, pp. 882, 1104.*

The Cache Memory Book, $2^{nd}$ edition, Jim Handy, Academic Press 1998, p. 207.*

(Continued)

*Primary Examiner*—Matt Kim
*Assistant Examiner*—John P Fishburn

(57) ABSTRACT

A system and computer system for improving data integrity and memory performance using non-volatile media. A system includes a non-volatile mass storage unit, e.g., a flash memory device and/or a hard drive unit for instance. A memory device is used as a high speed data buffer and/or cache for the non-volatile storage unit. The memory device may be non-volatile, e.g., magnetic random access memory (MRAM) or volatile memory, e.g., synchronous dynamic random access memory (SDRAM). By buffering and/or caching the write data, fewer accesses are required to the mass storage device thereby increasing system performance. Additionally, mechanical and electrical degradation of the mass storage device is reduced. Certain trigger events can be programmed to cause data from the memory device to be written to the mass storage device. In one embodiment, the write buffer contents are preserved across reset or power loss events. In one embodiment, the mass storage unit may be a data transport layer, e.g., Ethernet, USB, Bluetooth, etc.

25 Claims, 13 Drawing Sheets

OTHER PUBLICATIONS

Computer Architecture A Quantitative Approach, $3^{rd}$ edition, Hennessy & Patterson, 2003, Morgan Kaufman, pp. 691, 774.*

Computer Architecture A Quantitative Approach, 3rd edition, Hennessy & Patterson, 2003, Morgan Kaufman, pp. 458, 459.*

WinHEC: Samsung to Show "Flash" Laptop Hard Drives. Prototype Hybrid Hard Drive promises lower power consumption, fewer hard drive malfunctions. Joris Evers, IDG News Service. Apr. 25, 2005.

* cited by examiner

SYSTEM AND METHOD FOR IMPROVING DATA INTEGRITY AND MEMORY PERFORMANCE USING NON-VOLATILE MEDIA

BACKGROUND OF THE INVENTION

1. Field of the Invention

Embodiments of the present invention relate to computer systems having one or more non-volatile mass storage devices. More specifically, embodiments of the present invention relate to improving data integrity and system performance within a computer system that utilizes non-volatile data storage media or a non-volatile file system.

2. Related Art

Demand for non-volatile file systems is growing with particular demand for hand held or otherwise portable computer systems. Non-volatile file systems offer increased protection against data loss due to power loss for portable devices which often are battery operated and may be exposed to the risk of power loss due to battery discharge, replacement or failure. In the event of an unexpected power loss, data is typically maintained within a non-volatile file system.

Computer systems that include a non-volatile file system often consume substantial resources writing data to the non-volatile memory device, e.g., a flash memory or a hard drive. Moreover, non-volatile memory file systems must frequently write data in order to preserve it in case of a catastrophic power loss or device reboot. Unfortunately, both flash memory and hard drive devices have write latencies or delays that can degrade the user experience of such computer systems that frequently access the non-volatile memory device. For instance, hard drive devices have spin-up and track seek delays. Flash memory requires entire pages to be erased and re-written during write operations. Further, flash memory requires load balancing to prevent memory failure due to over-use. Both of these factors increase write latency for flash memory devices.

In addition to system performance issues described above, frequent access to the non-volatile memory device may also lead to system failure due to mechanical and/or electrical fragility of these devices. For instance, frequent use of the hard drive may lead to mechanical failure thereof, or, may increase the likelihood of data loss or damage in the event that the device is dropped or otherwise shocked during a read/write operation. Also, frequent use of the flash memory device may lead to electrical failure attributed to over-use of the same memory cells.

It would be advantageous to provide a computer system having a non-volatile file system with improved system performance. It would be advantageous to provide a computer system having a non-volatile file system that is less susceptible to mechanical and/or electrical failure of the non-volatile memory device.

SUMMARY OF THE INVENTION

Accordingly, embodiments of the present invention are directed to a computer system having a non-volatile file system but which provides improved system performance by reducing accesses to the non-volatile memory device. Because accesses to the non-volatile memory device are reduced, the computer system in accordance with embodiments of the present invention is also less susceptible to mechanical and/or electrical failure of the non-volatile memory device. As further described below, embodiments of the present invention provide a high speed write buffer for the non-volatile memory device which reduces the access frequency thereto. Caching data to be written back to the non-volatile media in a secondary, higher speed non-volatile media allows for burst writes to slow or fragile media such as hard disk drives, while preserving the data in the case of system failure or power loss.

A system and method are described herein for improving data integrity and memory performance using non-volatile media. A system includes a non-volatile mass storage unit, e.g., a flash memory device and/or a hard drive unit for instance. If flash memory is used, NAND or NOR memory may be used. A high speed memory device is used as a write buffer and/or read-back cache for the non-volatile storage unit. The memory device may be non-volatile, e.g., magnetic random access memory (MRAM) or volatile memory, e.g., synchronous dynamic random access memory (SDRAM). In various embodiments, systems with removable batteries may use MRAM while systems with non-removable power sources may use SDRAM as the memory device. By buffering and/or caching the write data, fewer accesses are required to the mass storage device thereby increasing system performance, e.g., write performance. Additionally, mechanical and electrical degradation of the mass storage device is reduced. Certain trigger events can be programmed to cause data from the memory device to be written to the mass storage device. In one embodiment, the write buffer contents are preserved across reset or power loss events.

In one embodiment, the mass storage unit may be a data transport (e.g., Ethernet, USB, Bluetooth, etc.) transmission device.

In one embodiment, an MRAM is used as a data buffer/cache for a hard drive unit. Alternatively, the MRAM may be used as a data buffer/cache for a flash device. In another embodiment, the MRAM may be used as a data buffer/cache for both a hard drive unit and a flash memory with the MRAM being partitioned for this operation. Alternatively, two separate MRAM devices may be used with one assigned to the flash and one assigned to the hard drive. In the above configurations, the MRAM may be replaced with an SDRAM. When using MRAM as the buffer/cache, flags ("dirty bits") within the MRAM data records indicate the last transfer state of the buffer, e.g., whether or not the data has been written to the mass data storage unit. Using this information, the system may recover with data integrity from both a reset event or a power loss/failure. Embodiments of the present invention are particularly well suited for use in conjunction with a non-volatile based file system, however, any file system may be advantageously used.

More specifically, embodiments of the present invention are directed to a computer system comprising: a non-volatile memory for storing data; a high speed non-volatile memory device; a file system for issuing a plurality of write commands corresponding to a plurality of data to be written to the non-volatile memory; and a driver, transparent to the file system, for storing the plurality of data into the high speed non-volatile memory device as the plurality of write commands are received by the driver and, in response to a trigger event, for writing the plurality of data to the non-volatile memory in a single memory access operation.

Embodiments of the present invention also include a computer implemented method of accessing a non-volatile media comprising: generating a plurality of data for storage into the non-volatile media; issuing a plurality of write commands over time to store the plurality of data to the non-volatile media; temporarily storing the plurality of data into a high speed memory device as the plurality of write commands are being issued; and in response to a trigger event, transferring the plurality of data from the high speed memory device to the non-volatile media wherein the plurality of data are transferred using a single media access operation.

DETAILED DESCRIPTION OF THE INVENTION

Reference will now be made in detail to the preferred embodiments of the present invention, a system and method for improving data integrity and write performance using non-volatile media, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Figure 1A:
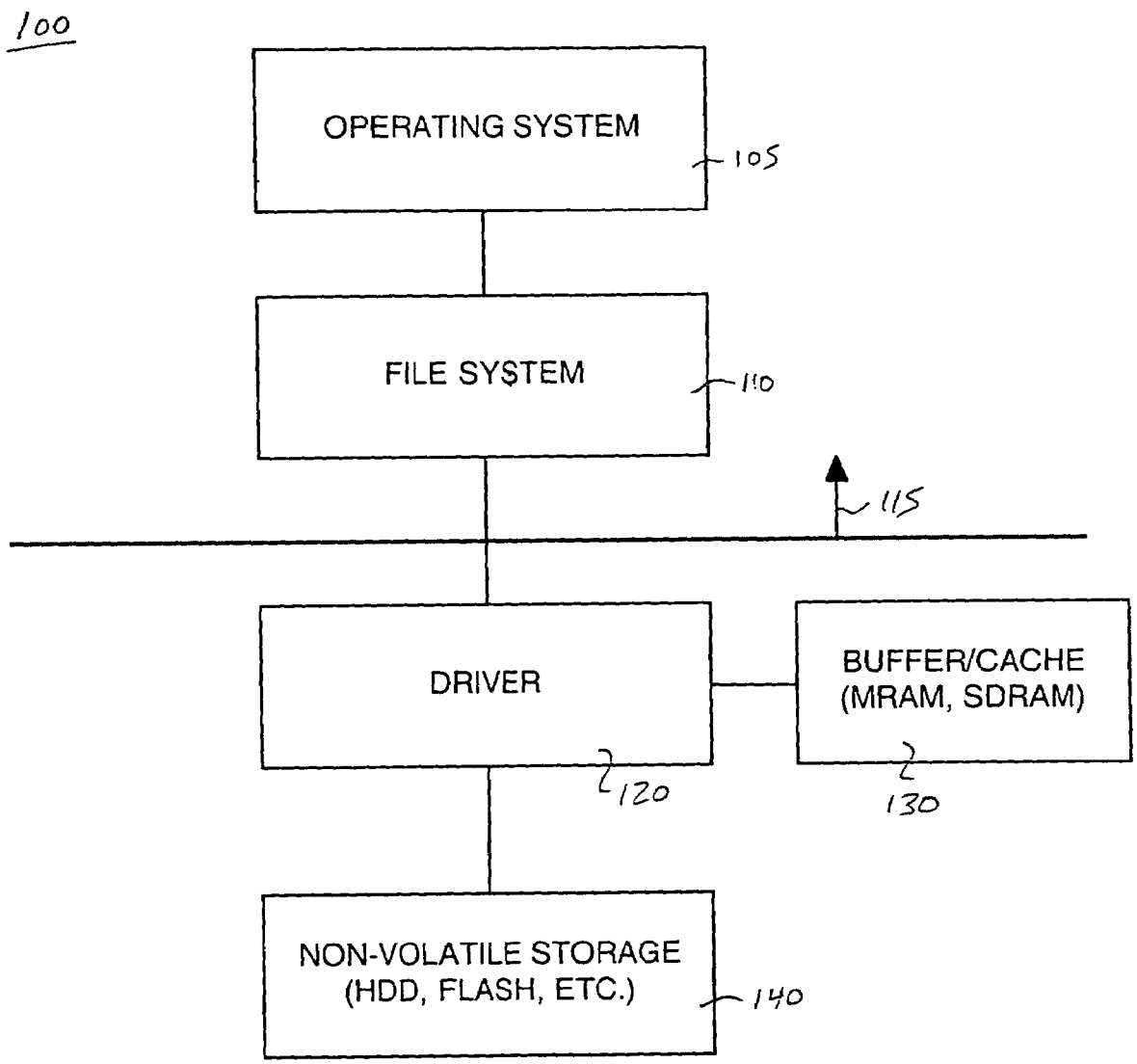
FIG. 1A is a software diagram of a system in accordance with one embodiment of the present invention utilizing a buffered/cached non-volatile mass storage device.

FIG. 1A is a software diagram of a computer or electronic system 100 in accordance with an embodiment of the present invention. System 100 includes an operating system 105 resident in memory which communicates with a file system 110. The file system 110 may be a non-volatile file system in one embodiment and may be record or journal based. The file system 110 communicates with a driver 120, e.g., a slot driver in one embodiment. The driver 120 communicates with a high speed secondary memory 130 which may be non-volatile or volatile. This memory 130 is referred to herein as buffer or cache memory. In various embodiments, the high speed memory 130 may be a cache or may be a buffer or may be used as both a buffer and a read-back cache. Memory 130 in one embodiment is magnetic random access memory (MRAM). Memory 130 may also be synchronous dynamic random access memory (SDRAM). For removable-battery powered systems, MRAM may be used and for non-removable-battery powered systems SDRAM may be used. The driver 120 also communicates with a non-volatile mass storage memory 140. This memory 140 may be any type of non-volatile memory but in various embodiments of the present invention it may be flash memory and/or hard drive media.

It is appreciated that memory 130 acts as a write buffer for data to be stored in the non-volatile memory 140. The presence of the write buffer 130 is made transparent to the file system 110 and any other component above level 115. By buffering data in high speed memory 130, the frequency of individual access operations to memory 140 is reduced thereby increasing system performance and reliability. Writes to memory 140 are buffered and cached in memory 130 by the driver 120 and the data is written to memory 140 upon certain triggers or other events according to driver detection and control. In embodiments that use MRAM as write buffer 130, system 100 preserves the write buffer contents upon a system failure, power loss or reset. Therefore, the contents of write buffer 130 in accordance with the present invention are preserved across a power or system failure. The MRAM is particularly well suited as a write buffer due to its extremely fast read and write speeds, byte-addressability, and the fact that it will not lose memory state on a power loss.

Figure 1B:
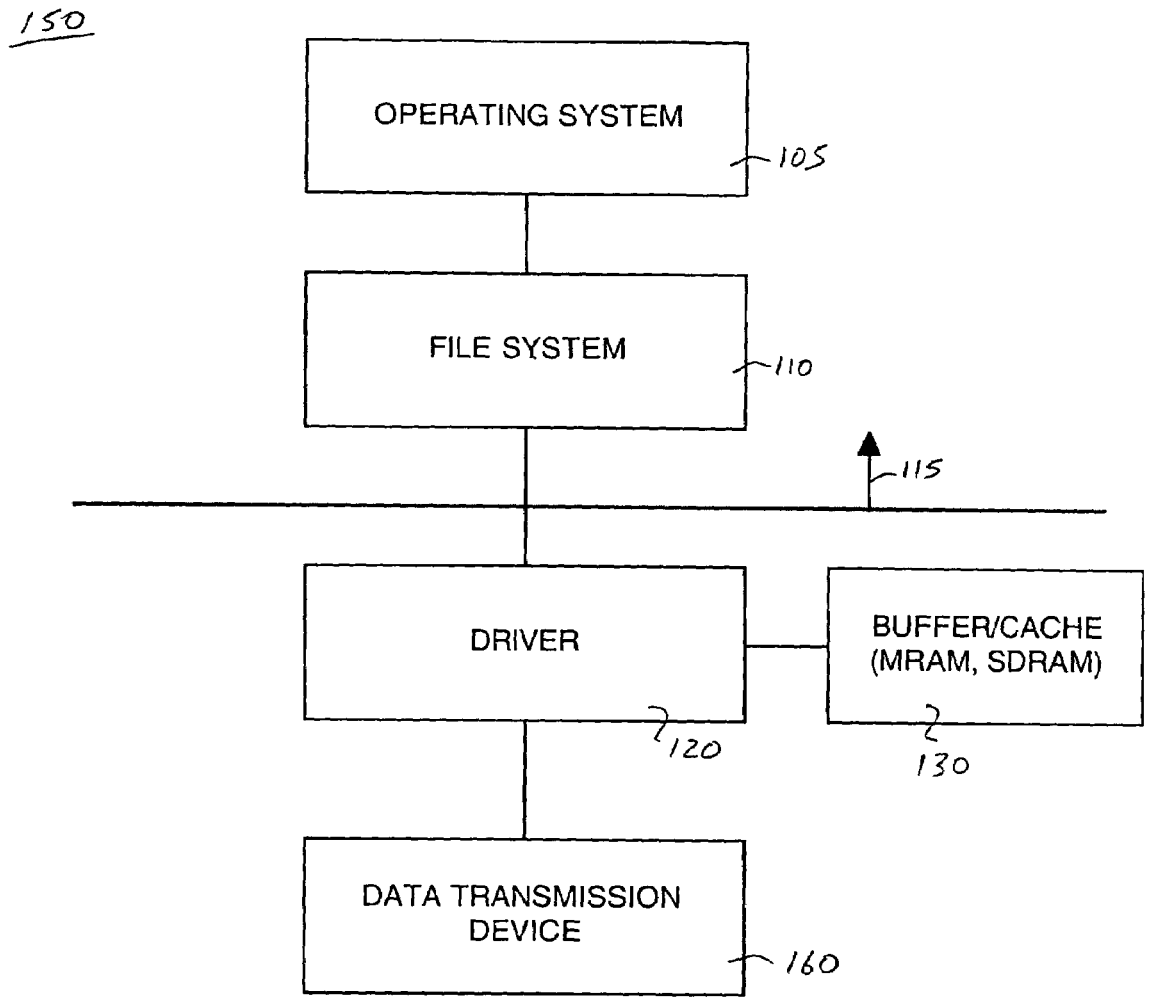
FIG. 1B is a software diagram of a system in accordance with one embodiment of the present invention utilizing a buffered/cached data transport, transmission device.

FIG. 1B illustrates a software diagram of system 150 in accordance with an embodiment of the present invention. System 150 is similar to system 100 except the non-volatile mass storage device 160 is a transmission device. Device 160 may be an Ethernet or USB or similar transport mechanism for moving data. The actual data storage device may be remote to system 150 and in communication with transport 160. Transport 160 could be any transport or communication protocol including the Internet. Transport 160 may be in communication with a remote computer system that communicates with driver 120. In this example, a host computer, e.g., a desktop computer, could include operating system 105, file system 110, driver 120 and high speed buffer 130. The host system could be in communication with a remote system (not shown) which is in communication with transport 160.

Figure 2:
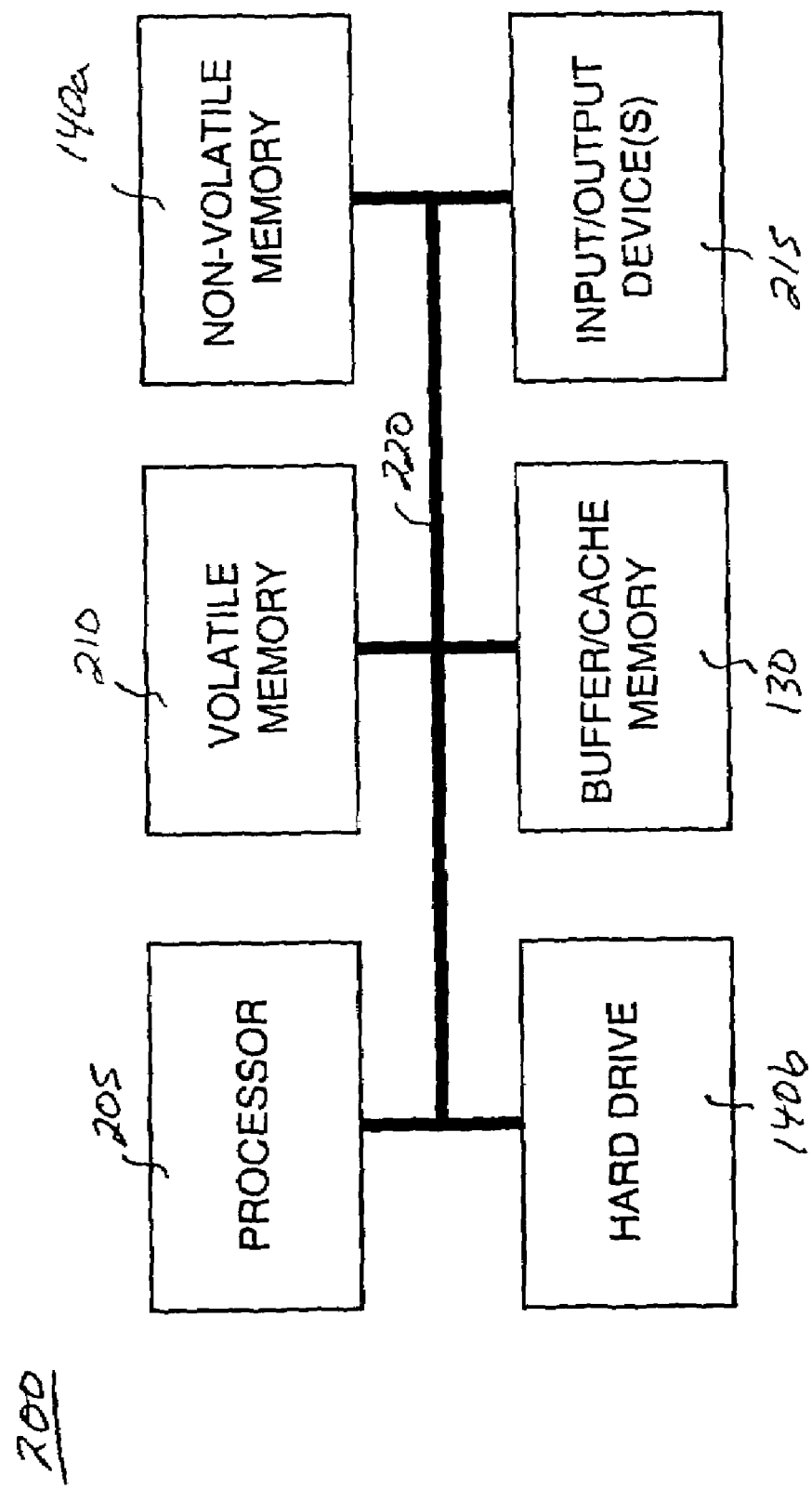
FIG. 2 is hardware diagram of a general purpose computer system which may be used as a platform for embodiments of the present invention.

FIG. 2 illustrates a hardware diagram of a general purpose computer system 200 which may serve as a platform for embodiments of the present invention. System 200 includes an address/data bus 220 coupled to a processor, e.g., a microprocessor 205. Bus 220 may be a single bus or multiple buses in communication with each other, e.g., via one or more intermediate circuits and/or bridges. A volatile memory 210 may optionally be coupled to bus 220 for storing instructions and data. A non-volatile memory 140a may be coupled to bus 220 and may, in one embodiment, be a flash memory implemented mass storage device. A hard drive 140b may optionally be coupled to bus 220. The high speed buffer/cache memory 130 is coupled to bus 220 and may be non-volatile, e.g., MRAM or volatile, e.g., SDRAM. Optionally, one or more input/output devices 215 may optionally be coupled to bus 220, e.g., communication device, alphanumeric input device, cursor directing device, display device, speaker device, etc. System 200 may also include a battery or other portable source of power for supplying power to the various components mentioned above. Device 200 may be a portable electronic device in one embodiment, e.g., portable computer, cellular phone, remote control device, game console, radio, etc.

Figure 3:
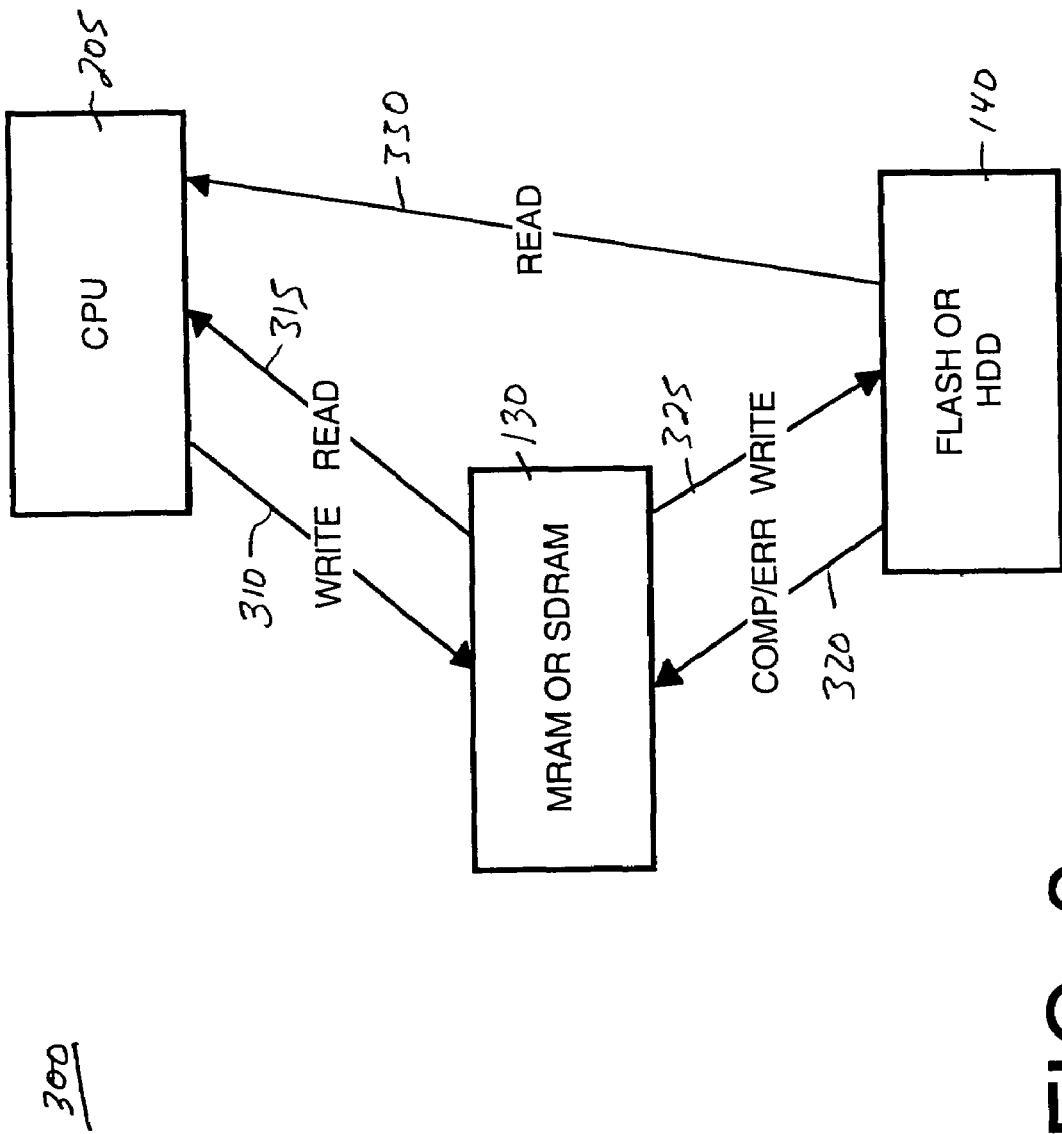
FIG. 3 is a data flow diagram in accordance with one embodiment of the present invention for read and write operations and illustrating certain feedback communication between the non-volatile mass storage unit and the high speed buffer/cache device.

FIG. 3 illustrates a data flow diagram 300 in accordance with one embodiment of the present invention regarding read and write operations. Driver 120 (FIG. 1A) directs writes to the high speed memory 130 as shown by 310. Upon a trigger event, this data is then transferred to the mass storage device 140 as shown by 325. When a unit of data is completely written to the mass storage device 140 from the high speed memory 130, a complete signal is sent back to the driver, as shown by 320. If the unit of data is not written, an error signal may be sent back, or no signal at all (in the case of a power failure, for instance). Special flags (e.g., "dirty bits") located in memory 130 will be updated based on the complete/error signals 320 corresponding to each data unit of memory 130. That is, after a unit of data or record has been successfully written to memory 140, a special flag associated with this unit may be updated. These flags can be examined to determine which data has been written to memory 140 and which data needs to be written.

Read operations are processed differently than writes. The driver 120 will first obtain read data from the high speed memory 130, assuming the read data is present therein, as shown by 315. In this implementation, memory 130 functions as a read-back cache. The read data is obtained from mass storage 140 only if the requested read data is not in memory 130, as shown by 330. This action maintains the data integrity of the data storage system. The operations of the driver, as shown in FIG. 3, are transparent to the file system 110 (FIG. 1A) which is aware only that it is reading and writing data and is unaware of the particular location of that data with respect to memory 130 and/or memory 140.

The write buffer 130 may be preserved across a reset or power failure in accordance with one embodiment of the present invention. Write buffer 130 may be MRAM which is non-volatile. In this embodiment, the data located in the write buffer persists after a power failure or reset. Upon re-activation, driver 120 examines the contents of memory 130 to determine if any units remain unwritten. If so, they are immediately written to memory 140, as shown in 325. This process is described more particularly with reference to FIG. 8.

Figure 4A:
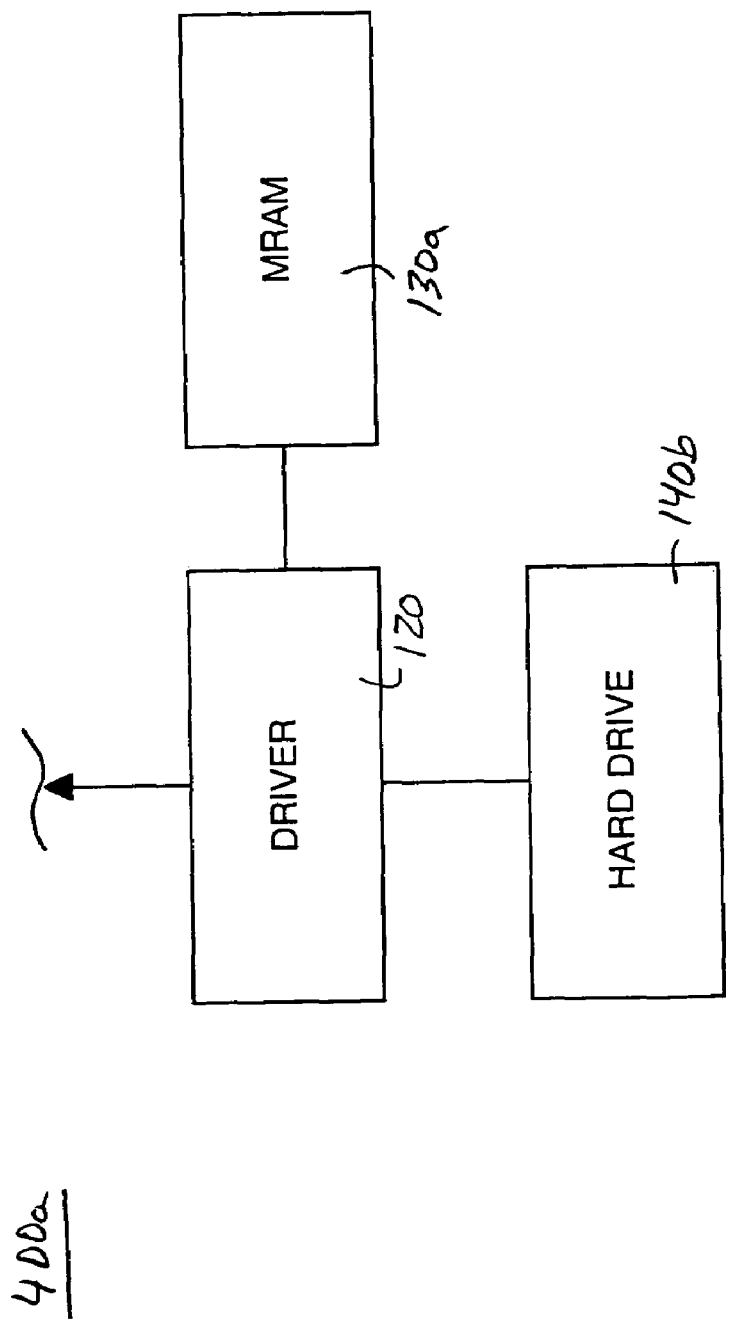
FIG. 4A is an illustration of an embodiment of the present invention having a hard drive buffered by an MRAM device.

FIG. 4A illustrates a portion 400a of an exemplary implementation of system 100 (FIG. 1A). The remaining elements of system 100 are the same as shown in FIG. 1A. In this embodiment, the write buffer 130a is non-volatile MRAM which is byte addressable. The MRAM may be obtained from Freescale, a division of Motorola of Austin, Tex. and may be supplied in chips of 4 Megabytes in size. The access time of MRAM is on the order of 10 ns in one example. The mass storage device 140b in this example is a hard drive. Both are in communication with driver 120. Write data for the hard drive 140b may be buffered or cached or both using high speed MRAM 130a thereby reducing the access frequency of device 140b. This implementation preserves the write buffer 130a over a reset or power loss event and thereby preserves data integrity of device 140a over these events as well.

Figure 4B:
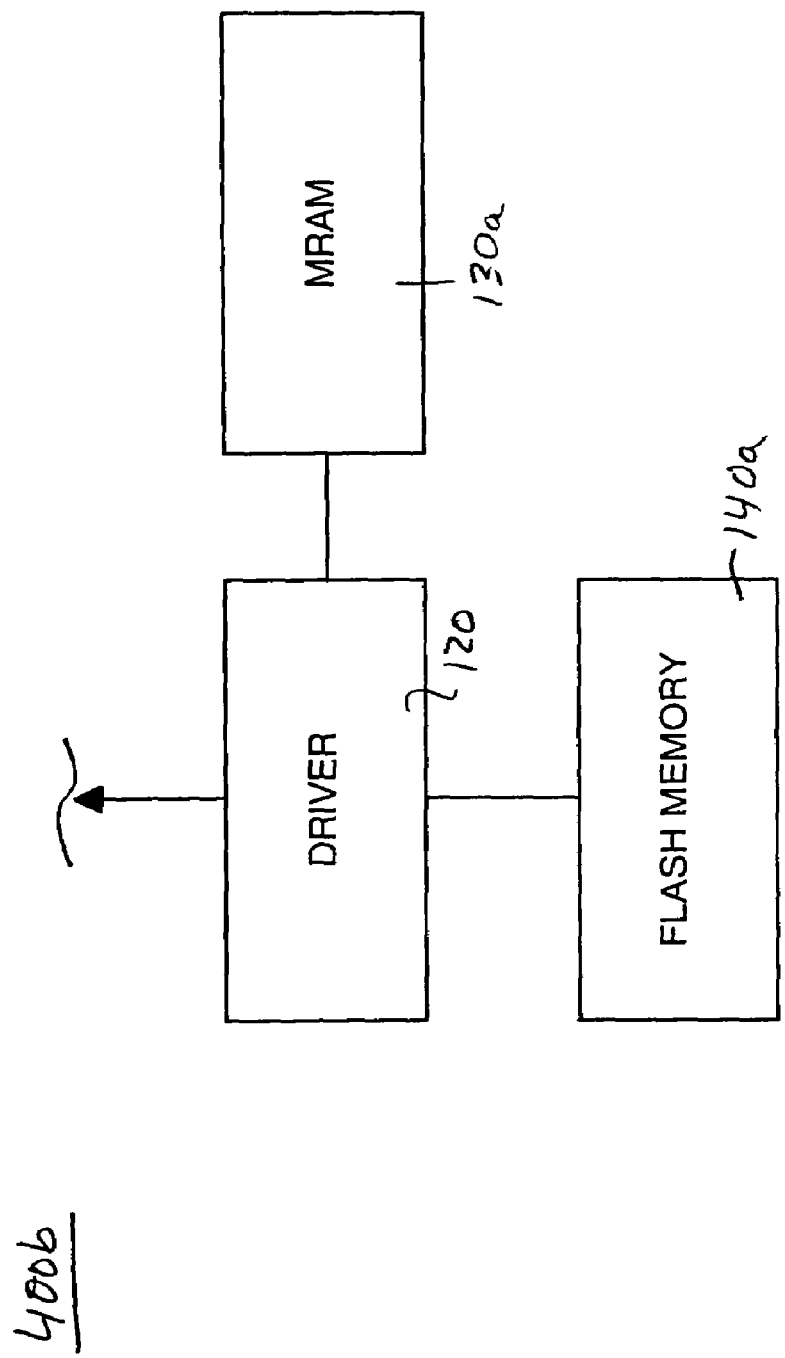
FIG. 4B is an illustration of an embodiment of the present invention having a flash memory device buffered by an MRAM device.

FIG. 4B illustrates a portion 400b of an exemplary implementation of system 100 (FIG. 1A). The remaining elements of system 100 are the same as shown in FIG. 1A. In this embodiment, the write buffer 130a is non-volatile MRAM. The mass storage device 140a in this example is flash memory. Both are in communication with driver 120. The flash memory may be any non-volatile flash memory, e.g., NAND flash or NOR flash. Write data for the flash memory 140a may be buffered or cached or both using high speed MRAM 130a thereby reducing the access frequency of device 140a. This implementation preserves the write buffer 130a over a reset or power loss event and thereby preserves data integrity of device 140b over these events as well.

Figure 4C:
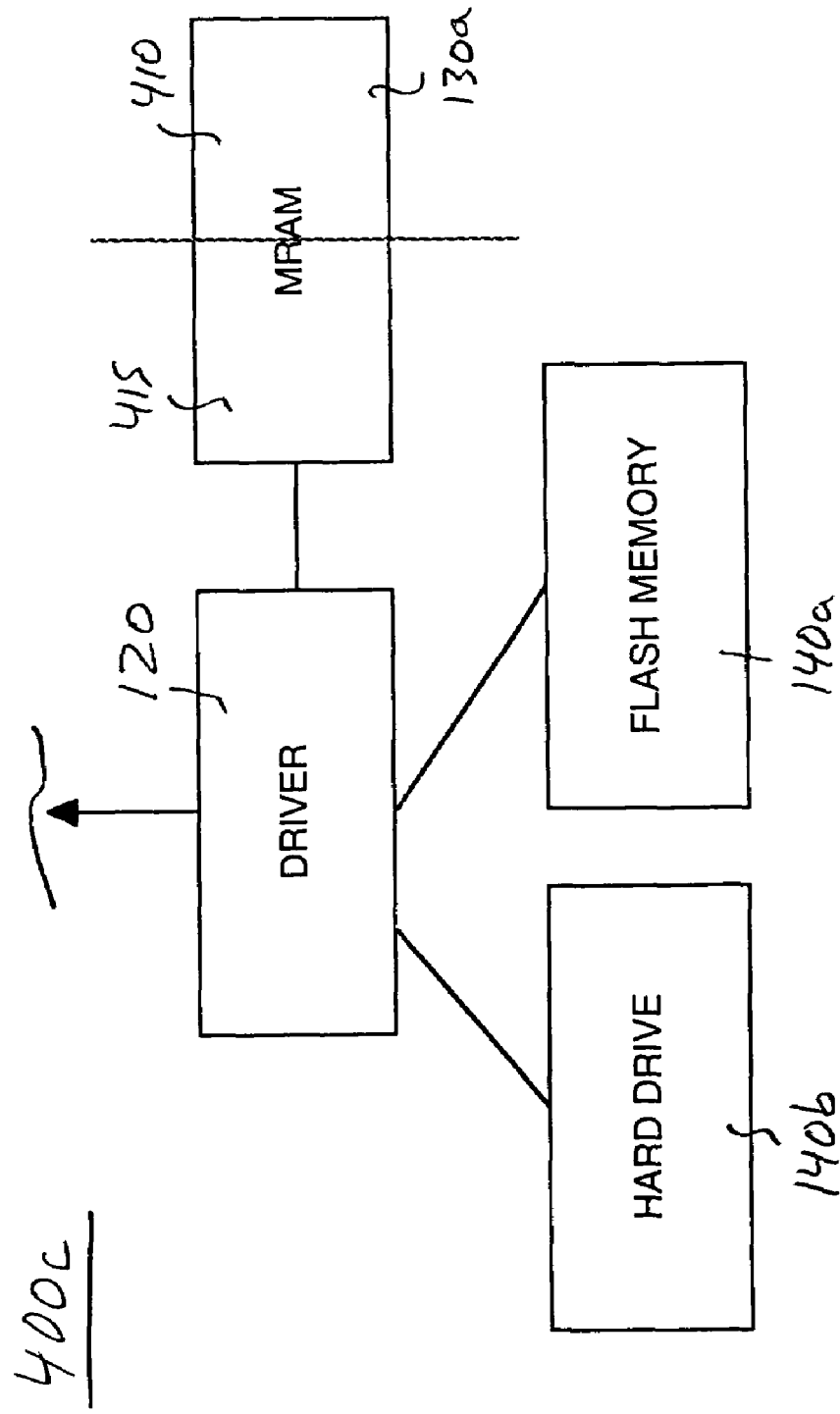
FIG. 4C is an illustration of an embodiment of the present invention having a flash memory device and a hard drive device both buffered by a partitioned MRAM device.

FIG. 4C illustrates a portion 400c of an exemplary implementation of system 100 (FIG. 1A). The remaining elements of system 100 are the same as shown in FIG. 1A. In this embodiment, the write buffer 130a is non-volatile MRAM and is partitioned into two parts 410 and 415. The mass storage device in this example is flash memory 140a and a hard drive 140b. All are in communication with driver 120. The flash memory 140a may be any non-volatile flash memory, e.g., NAND flash or NOR flash. Write data for the flash memory 140a may be buffered or cached or both using portion 410 of the high speed MRAM 130a thereby reducing the access frequency of device 140a. Write data for the hard drive 140b may be buffered or cached or both using portion 415 of the high speed MRAM 130a thereby reducing the access frequency of device 140b. This implementation preserves the write buffer 130a over a reset or power loss event and thereby preserves data integrity of device 140a and device 140b over these events as well.

Figure 4D:
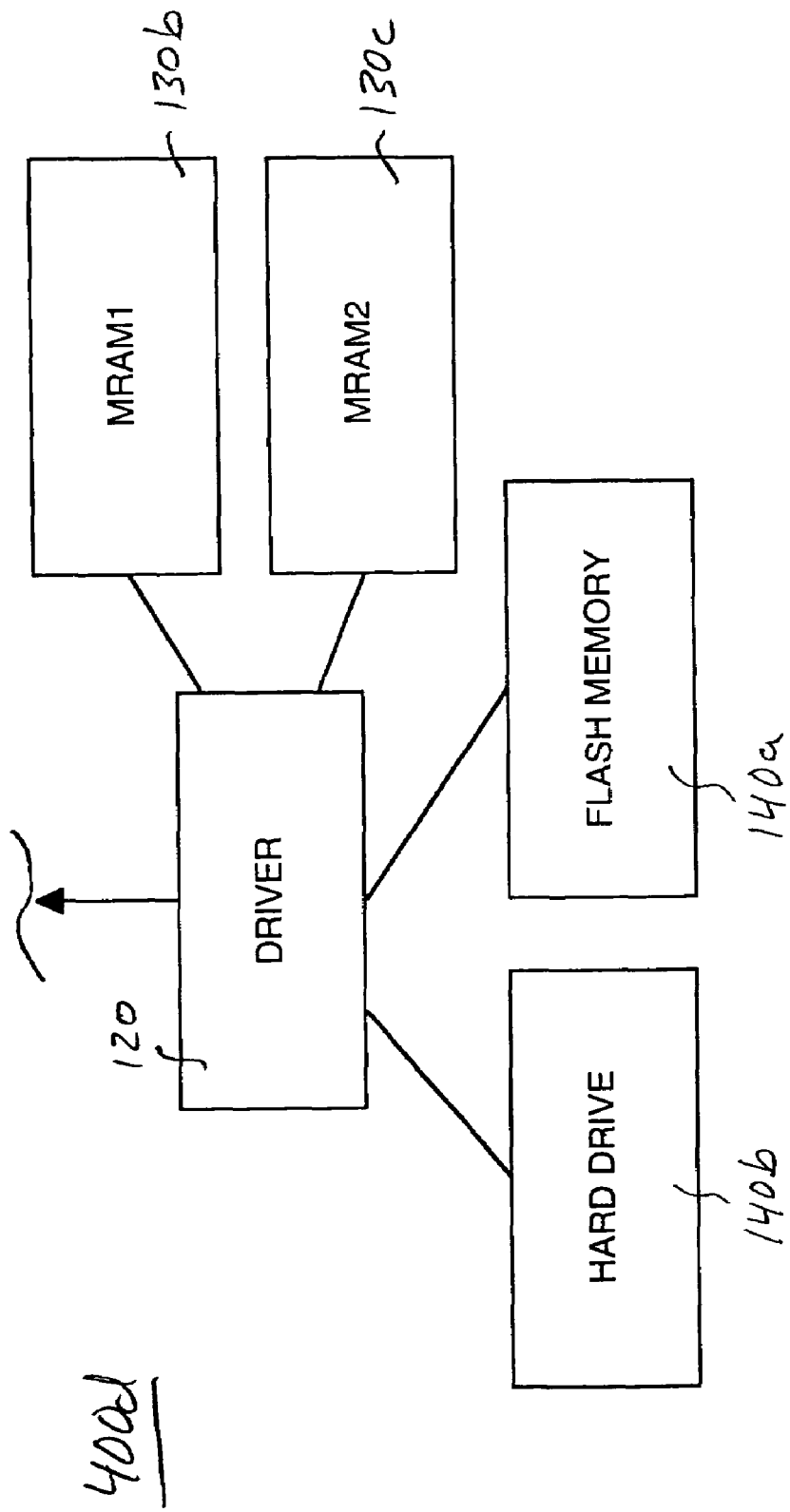
FIG. 4D is an illustration of an embodiment of the present invention having a flash memory device and a hard drive device both buffered using separate MRAM devices.

FIG. 4D illustrates a portion 400d of an exemplary implementation of system 100 (FIG. 1A). The remaining elements of system 100 are the same as shown in FIG. 1A. In this embodiment, the write buffer includes separate buffer devices 130b and 130c and each is non-volatile MRAM. The mass storage device in this example is flash memory 140a and a hard drive 140b. All are in communication with driver 120. The flash memory 140a may be any non-volatile flash memory, e.g., NAND flash or NOR flash. Write data for the flash memory 140a may be buffered or cached or both using the high speed MRAM 130b thereby reducing the access frequency of device 140a. Write data for the hard drive 140b may be buffered or cached or both using the high speed MRAM 130c thereby reducing the access frequency of device 140b. This implementation preserves the write buffers 130b and 130c over a reset or power loss event and thereby preserves data integrity of device 140a and device 140b over these events as well.

The embodiments shown in FIG. 4A, 4B, 4C and 4D are particularly useful for devices that are powered by batteries or other portable power source because they offer protection from power loss, power failure, etc.

Figure 5:
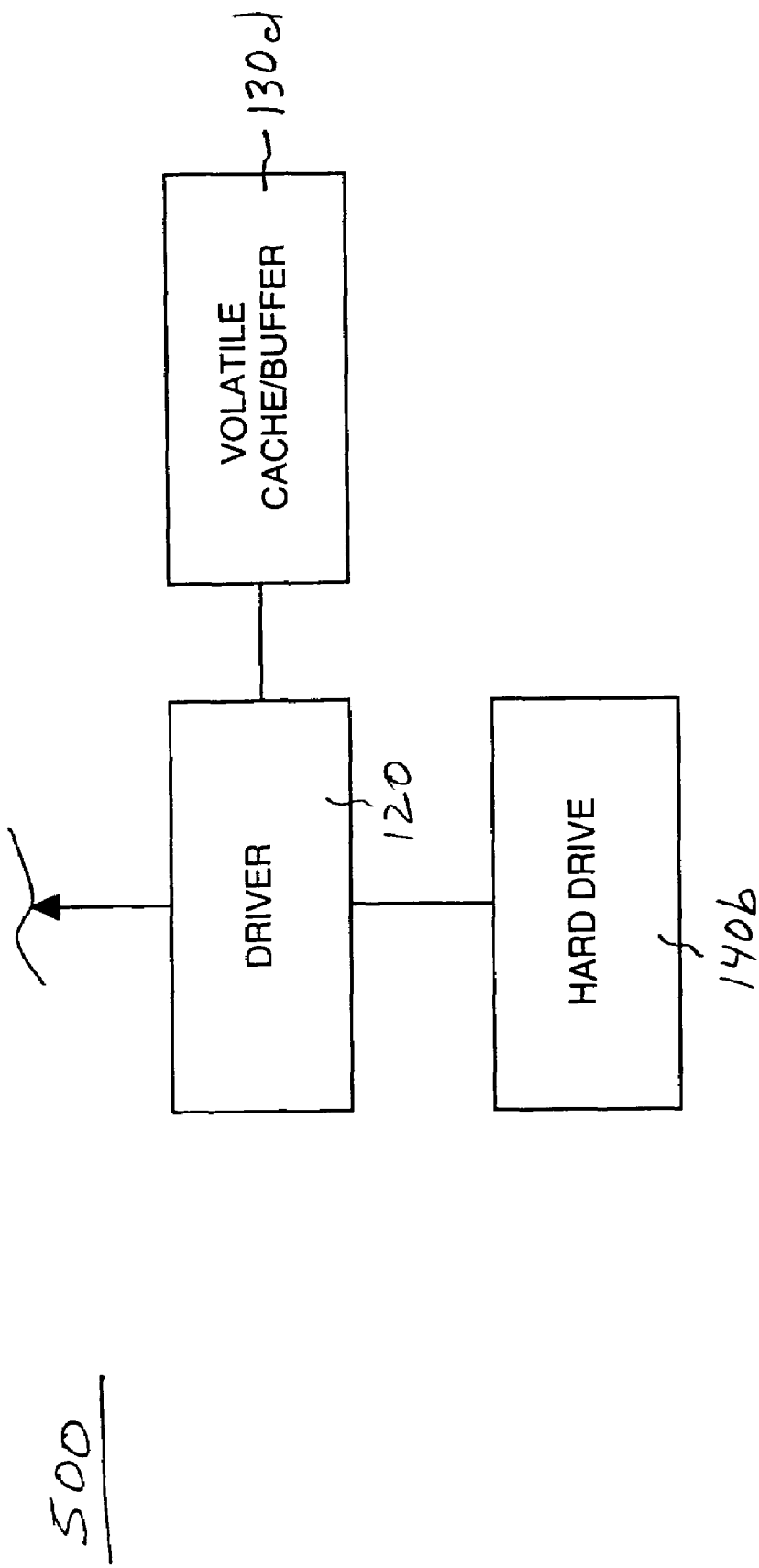
FIG. 5 is an illustration of an embodiment of the present invention having a hard drive buffered by a high speed volatile memory buffer/cache.

FIG. 5 illustrates a portion 500 of an exemplary implementation of system 100 (FIG. 1A). The remaining elements of system 100 are the same as shown in FIG. 1A. In this embodiment, the high speed write buffer 130d is volatile SDRAM. This embodiment is useful for a desktop or laptop system in which power is obtained directly from a power outlet or from a battery that is not easily removed or readily discharged and therefore power failure is not a relatively likely or anticipated event. The mass storage device 140b in this example is a hard drive, but alternatively could be a flash memory (or both). Both are in communication with driver 120. Write data for the hard drive 140b may be buffered or cached or both using high speed SDRAM 130d thereby reducing the access frequency of device 140b. Unlike the non-volatile buffer embodiments discussed above, this implementation 500 will not preserve the write buffer 130d over a reset or power loss event.

It is appreciated that in all the embodiments discussed with respect to FIG. 4A, FIG. 4B, FIG. 4C, FIG. 4D and FIG. 5, the non-volatile storage device may be replaced with a transport or transmission device 160 as discussed with respect to FIG. 1B.

Figure 6:
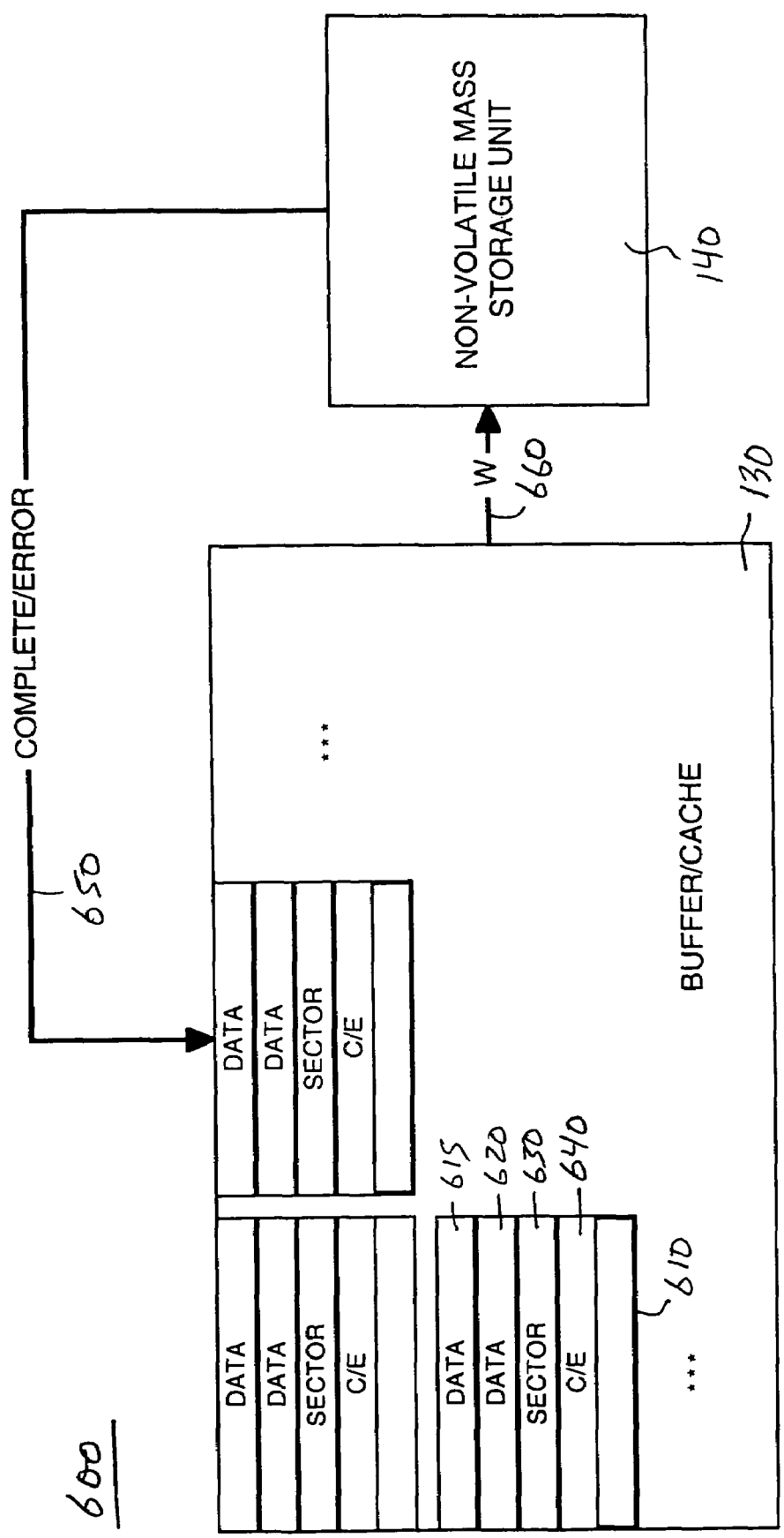
FIG. 6 is a diagram of an exemplary data structure for contents of the buffer/cache device in accordance with embodiments of the present invention.

FIG. 6 illustrates an exemplary data structure that may be used by the write buffer 130 in accordance with an embodiment of the present invention. The write buffer 130 may be divided into discrete storage records or memory units 610. Each record contains one or more data items 615 and 620 for storage into mass storage unit 140 via write commands 660. Each record may also optionally contain a sector identification 630 which may specify a particular location in storage 140 at which the record is to be stored. This sector information may be computed by the driver 120.

Importantly, each buffer record or unit also contains a complete/error flag 640 which indicates whether or not the unit has been written to mass storage unit 140. These flags may also be called "dirty bits." If the complete flag is set, then this indicates that the corresponding buffer record has been written to mass storage unit 140 and a feedback signal 650 was received to indicate that the write of the corresponding buffer record was completed, e.g., successful. If the error flag is set, then either the corresponding buffer record has not yet been written to storage 140, or the operation failed in error. In either situation, the corresponding buffer record needs to be written to mass storage 140 in order to maintain data integrity. In one embodiment, upon creation of a new buffer record, the error flag is initially set and the complete flag is not set until a feedback signal 650 is obtained for that buffer record. It is appreciated that buffer records having a complete flag set may be reused, e.g., reclaimed, for new data to be stored as vacant memory in buffer 130 becomes required for new data. Buffer records residing in buffer 130, may operate as a cache to reduce accesses to unit 140.

As described in more detail below, the complete/error flags are used by the driver 120 in recovering from power and system failures to maintain data integrity. Upon a reset or power-on condition, the complete/error flags can be immediately inspected to determine which records need to be stored to mass storage unit 140 and which have already been written thereto.

Figure 7A:
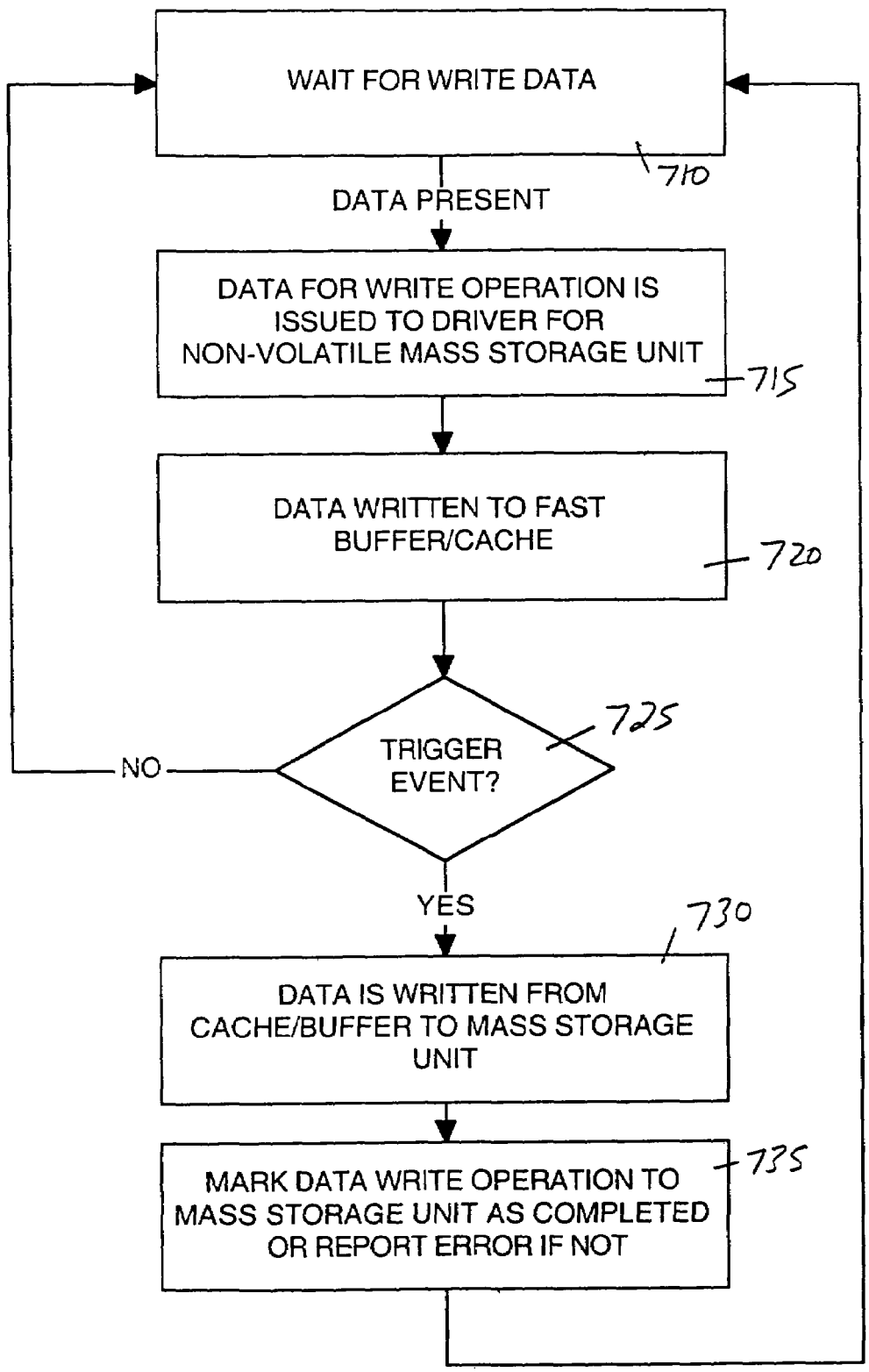
FIG. 7A is a flow diagram of steps performed by a buffered write operation in accordance with an embodiment of the present invention.

FIG. 7A is a flow diagram illustrating computer implemented steps in a data write operation in accordance with an embodiment of the present invention. According to process 700, when the driver 120 is notified that data is to be written, then step 715 is entered. At step 715, a data write operation for the non-volatile mass storage unit 140 is issued to the driver 120. The data write request may originate from the processor via the file system 110 (FIG. 1A for instance), or from any source. At step 720, the driver 120 generates one or more buffer records to accommodate the write operation and stores them in the high speed buffer 130. At this time, the mass storage unit 140 is not accessed. To obtain buffer space for the new records, the driver 120 may re-use old records that have already been written to the storage unit 140.

At step 730, in response to a trigger event, the buffer records are stored using a single or common write operation to the mass storage unit 140. Writing data to the buffer 130 is done transparently to file system 110. The trigger may be detected at step 725 or step 710 may be entered if no trigger is detected. At step 730, in response to the trigger event, the driver 120 scans the buffer records to determine which need to be written to unit 140 and which do not. Records needing to be written to unit 140 are queued up and written in a batch fashion to the unit 140 as a single or in a common write operation. In one embodiment, the data items are written to unit 140 in order of being received by the driver 120, e.g., first-in-first-out buffer.

Any event can be used as the trigger. In one embodiment, the trigger event occurs periodically, e.g., in the background, according to a programmable threshold of time. The trigger event could also be generated in response to unit 140 being idle or in response to a power down event. The trigger event could also be generated in response to a battery low condition or a battery door being opened by the user. The trigger event could also be generated in response to the operating system 105 changing from one mode to another or in response to an application program starting up or closing down. The trigger event could also be generated in response to the processor being detected as idle. Another trigger event could be in response to buffer 130 becoming full or in response to a predetermined number of buffer records being written to buffer 130. Trigger events could also be generated in response to a peripheral device being connected to or removed from bus 220. Other triggers may include the system being charged or when the hard drive spins up or in advance of a synchronization process or a drive mode connection, etc.

At step 735, during the write operation to unit 140, feedback signals 650 indicate which buffer records have been successfully stored. The complete/error flags are updated for each successful record stored in unit 140. On an error, the buffer record is written again to unit 140. Buffer records completely transferred and stored in unit 140 without error are eligible to be re-written as new records.

Figure 7B:
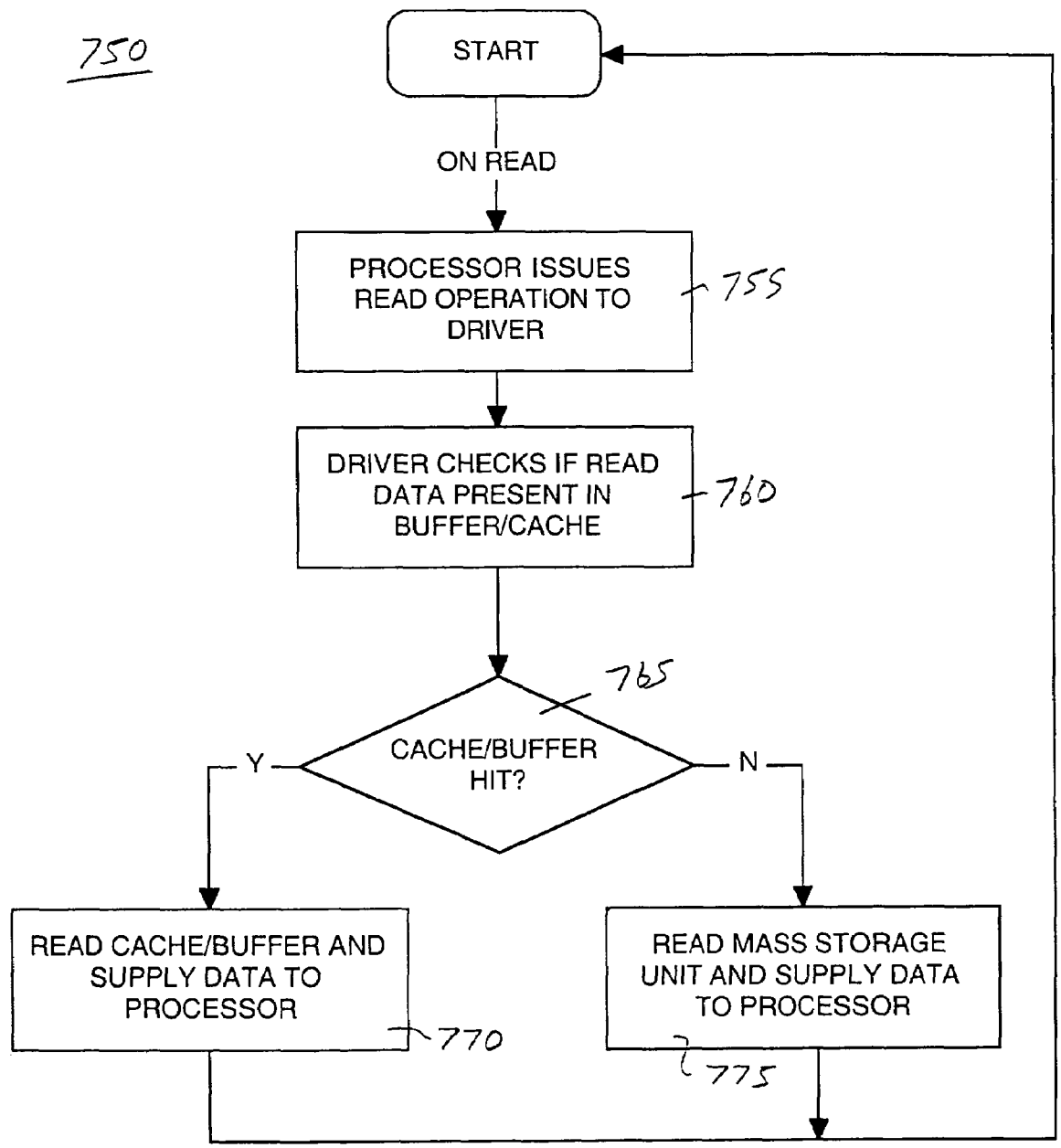
FIG. 7B is a flow diagram of steps performed by a read operation in accordance with an embodiment of the present invention.

FIG. 7B is a flow diagram illustrating computer implemented steps in a data read operation in accordance with an embodiment of the present invention. According to process 750, at step 755 the driver 120 is notified that data is to be read from unit 140. The processor or the file system 110 may issue the read request operation and it may include one or more data items of mass storage unit 140. At step 760, the driver 120 first checks the buffer 130 to determine if the requested read data is located within high speed buffer 130. If there is a buffer cache hit, then at 770, the data is returned from the buffer 130 (to the file system 110) without accessing unit 140. This occurs transparently to the file system 110. If the requested data is not present in buffer 130, then at step 775 mass storage unit 140 is accessed for the data and the data is returned to the file system 110. Again, this occurs transparently to the file system 110. It is appreciated that if the read request contains several read items, some causing a cache hit and some not, then both steps 770 and 775 may be used. In this case, data items hitting cache 130 are obtained from the high speed buffer 130 and the others may be obtained from the unit 140.

Figure 8:
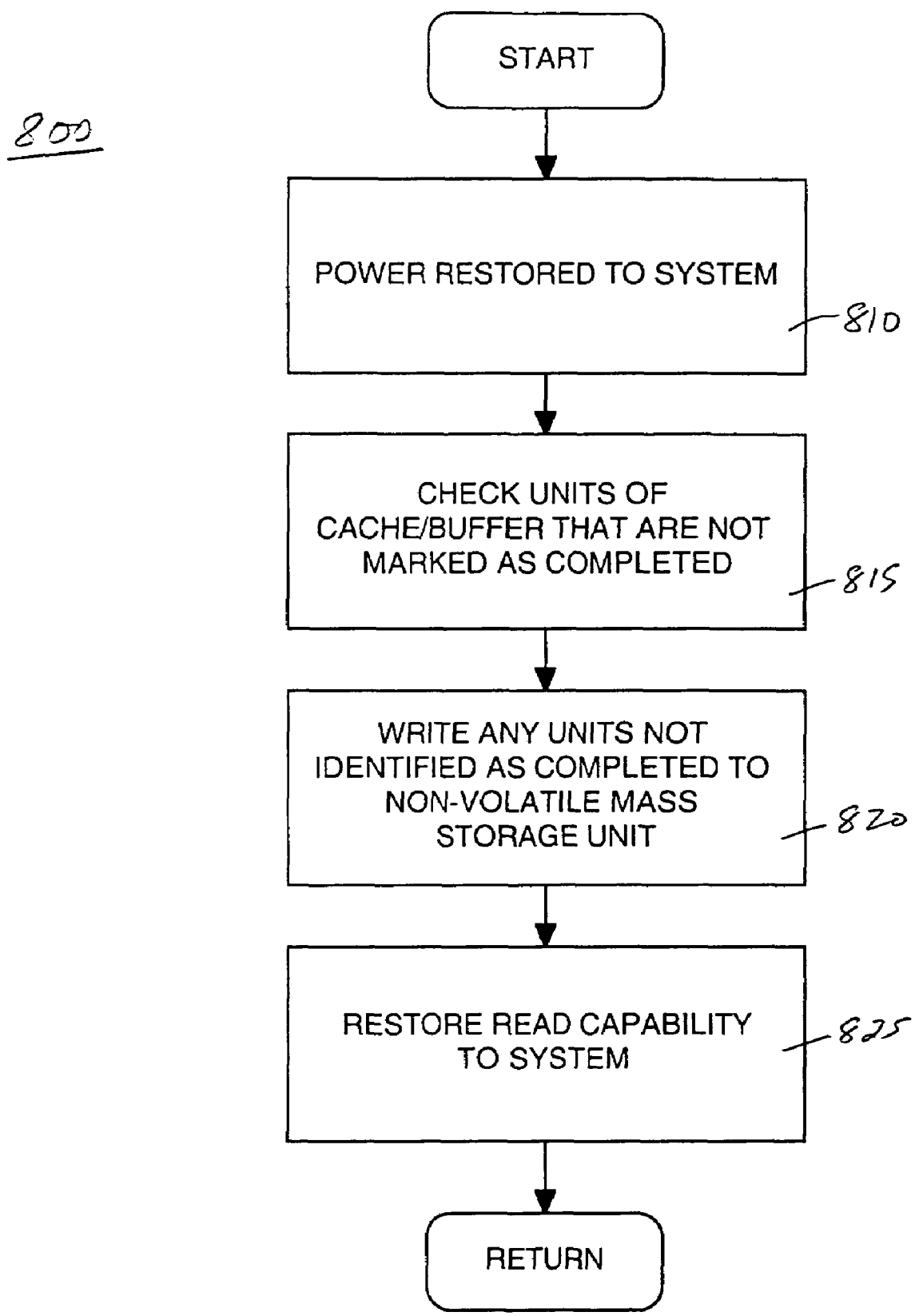
FIG. 8 is a flow diagram of steps performed by an embodiment of the present invention for maintaining the write buffer over a reset or power failure event while maintaining data integrity of the non-volatile mass storage unit.

FIG. 8 is a flow diagram 800 of computer implemented steps performed by an embodiment of the present invention for maintaining the write buffer over a reset or power failure event while maintaining data integrity of the non-volatile mass storage unit. Embodiments of the present invention that utilize non-volatile memory as the write buffer 130 (e.g., flash or MRAM) preserve the write buffer contents across reset, power loss or power failure events. Therefore, data stored in the high speed buffer 130 (but not written to the mass storage unit 140) may be written to mass storage unit 140 after one of these system events because the transfer state (before the event) was recorded in the buffer memory 130. Process 800 is an exemplary recovery process.

At step 810, power is restored to the computer system 200 or a reset event occurred. At step 815, the driver 120 immediately checks the buffer records (units) of the write buffer 130 to determine if any have error flags set (e.g., do not have a complete bit set). At step 820, the driver writes any buffer records identified in step 815 to the mass storage unit 140. Upon a signal that the buffer records have been written, the driver sets their complete flag. At step 825, read capability for the mass storage unit 140 is then restored and the file system 110 started.

It is appreciated that a similar process to 800 could be used for an embodiment using SDRAM as the write buffer 130. In this case, the write buffer could be preserved across a reset condition, but not a total power loss condition, provided the system software did not reset the SDRAM. The other aspects of process 800 would remain the same as described above.

The foregoing descriptions of specific embodiments of the present invention, a system and method for improving data integrity and reducing write latency using non-volatile media, have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of accessing a non-volatile media having a file system, the method comprising:
   temporarily storing a unit of data into a high speed memory device as a plurality of write commands is received by a driver, said driver being transparent to said file system;
   setting a flag to identify whether said unit of data has been transferred from said high speed memory device to said non-volatile media, wherein said flag remains set through any subsequent power loss event and wherein said flag remains set through any subsequent reset event, and wherein a respective flag is associated with each unit of data stored in said high speed memory device;
   in response to one of a power loss event and a reset event and after restoring power, checking said flag and if said unit of data has not been transferred from said high speed memory device to said non-volatile media then transferring said unit of data from said high speed memory device to said non-volatile media using a single media access operation; and
   in response to a trigger event other than a power loss event and other than a reset event, checking said flag and if said unit of data has not been transferred from said high speed memory device to said non-volatile media then transferring said unit of data from said high speed memory device to said non-volatile media using a single media access operation.

2. The method as described in claim 1 wherein said high speed memory device is a magnetic random access memory (MRAM) device.

3. The method as described in claim 1 wherein said non-volatile media is a hard drive device.

4. The method as described in claim 1 wherein said non-volatile media is a flash memory device.

5. The method as described in claim 4 wherein said flash memory device is selected from the group consisting of: NAND flash memory; and NOR flash memory.

6. The method as described in claim 1 wherein said high speed memory device is a synchronous dynamic random access memory (SDRAM) device.

7. The method as described in claim 1 wherein said trigger event is selected from the group consisting of:
   in response to opening a door for a battery;
   in response to a change in an operating system of said non-volatile media from one mode to another;
   in response to a program beginning or ending execution in said non-volatile media;
   in response to a buffer in said non-volatile media becoming full;
   in response to a predetermined number of buffer records being written to a buffer in said non-volatile media;
   in response to a peripheral device being connected to or removed from a bus of said non-volatile media;
   in response to said non-volatile media being charged;
   in response to when a hard drive of said non-volatile media spins up;
   in advance of a synchronization process or drive mode connection;
   performed periodically over a predetermined period;
   in response to said non-volatile media being idle; and
   in response to a low battery condition.

8. The method as described in claim 1 further comprising:
   in response to a read command of said non-volatile media, supplying data for said read command from said high speed memory device if said data is located therein; and otherwise, supplying said data for said read command from said non-volatile media.

9. The method as described in claim 1 wherein said non-volatile media is a data transport transmission device.

10. A computer system having a file system, the computer system comprising:
    a non-volatile memory for storing data;
    a non-volatile high speed memory device coupled to said non-volatile memory; and
    a processor coupled to said non-volatile memory and for issuing a plurality of write commands corresponding to a unit of data to be written to said non-volatile memory, wherein a driver, transparent to said file system, is operable for storing said unit of data into said high speed memory device as said plurality of write commands is received by said driver;
    wherein a flag associated with said unit of data is set to identify whether said unit of data has been written from said high speed memory device to said non-volatile memory, wherein said flag remains set through any subsequent power loss event and wherein said flag remains set through any subsequent reset event, and wherein a respective flag is associated with each unit of data stored in said high speed memory device; wherein further, in response to one of a power loss event and a reset event and after restoring power, said flag is checked and if said unit of data has not been written from said high speed memory device to said non-volatile memory then said unit of data is written from said high speed memory device to said non-volatile memory using a single media access operation; and wherein in response to a trigger event other than a power loss event and other than a reset event, said flag is checked and if said unit of data has not been written from said high speed memory device to said non-volatile memory then said unit of data is written from said high speed memory device to said non-volatile media using a single media access operation.

11. The computer system as described in claim 10 wherein said high speed memory device is a magnetic random access memory (MRAM) device.

12. The computer system as described in claim 10 wherein said non-volatile memory is a hard drive device.

13. The computer system as described in claim 10 wherein said non-volatile memory is a flash memory device.

14. The computer system as described in claim 13 wherein said flash memory device is from the group consisting of: NAND flash memory; and NOR flash memory.

15. The computer system as described in claim 10 wherein said high speed memory device is a synchronous dynamic random access memory (SDRAM) device.

16. The computer system as described in claim 10 wherein said trigger event is selected from the group consisting of:
- in response to opening of a door for a battery;
- in response to a change in an operating system of said computer system from one mode to another;
- in response to a program beginning or ending execution in said computer system;
- in response to a buffer in said computer system becoming full;
- in response to a predetermined number of buffer records being written to a buffer in said computer system;
- in response to a peripheral device being connected to or removed from said bus of said computer system; in response to said computer system being charged;
- in response to when a hard drive of said computer system spins up;
- in advance of a synchronization process or drive mode connection;
- performed periodically over a predetermined period;
- in response to said non-volatile media being idle; and
- in response to a low battery condition.

17. The computer system as described in claim 10 wherein said driver is further operable to:
- in response to a read command of said non-volatile media, supply data for said read command from said high speed memory device if said data is located therein; and
- otherwise supply said data for said read command from said non-volatile memory.

18. The computer system as described in claim 10 wherein said non-volatile memory is a data transport transmission device.

19. A computer system comprising:
- a non-volatile memory for storing data; and
- a high speed non-volatile memory device; wherein a file system issues a plurality of write commands corresponding to a unit of data to be written to said non-volatile memory; and wherein a driver, transparent to said file system, stores said unit of data into said high speed non-volatile memory device as said plurality of write commands is received by said driver and, in response to a trigger event, writes said unit of data to said non-volatile memory in a single memory access operation;
- wherein a flag associated specifically with said unit of data is set to identify whether said unit of data has been written from said high speed non-volatile memory device to said non-volatile memory, wherein said flag remains set through any subsequent power loss event and wherein said flag remains set through any subsequent reset event, and wherein a respective flag is associated with each unit of data stored in said high speed memory device; wherein further, in response to one of a power loss event and a reset event and after restoring power, said flag is checked and if said unit of data has not been written from said high speed memory device to said non-volatile memory then said unit of data is written from said high speed non-volatile memory device to said non-volatile memory using a single media access operation; and wherein in response to a trigger event other than a power loss event and other than a reset event, said flag is checked and if said unit of data has not been written from said high speed non-volatile memory device to said non-volatile memory then said unit of data is written from said high speed non-volatile memory device to said non-volatile media using a single media access operation.

20. The computer system as described in claim 19 wherein said high speed non-volatile memory device is a magnetic random access memory (MRAM) device.

21. The computer system as described in claim 19 wherein said non-volatile memory is a hard drive device.

22. The computer system as described in claim 19 wherein said non-volatile memory is a flash memory device.

23. The computer system as described in claim 19 wherein said trigger event is selected from the group consisting of:
- in response to opening a door for a power source;
- in response to a change in an operating system of said computer system from one mode to another;
- in response to a program beginning or ending execution in said computer system;
- in response to a buffer in said computer system becoming full;
- in response to a predetermined number of buffer records being written to a buffer in said computer system;
- in response to a peripheral device being connected to or removed from a bus of said computer system; in response to said computer system being charged;
- in response to when a hard drive of said computer system spins up;
- in advance of a synchronization process or drive mode connection;
- performed periodically over a predetermined period;
- in response to said non-volatile media being idle; and
- in response to a low battery condition.

24. The computer system as described in claim 19 wherein said driver is further operable to:
- in response to a read command of said non-volatile media, supply data for said read command from said high speed non-volatile memory if said data is located therein; and
- otherwise supply said data for said read command from said non-volatile memory.

25. The computer system as described in claim 19 wherein said non-volatile memory is a data transport transmission device.

* * * * *